US011866524B2

(12) United States Patent
Zhang et al.

(10) Patent No.: US 11,866,524 B2
(45) Date of Patent: *Jan. 9, 2024

(54) WATER-BASED PRESSURE SENSITIVE ADHESIVE COMPOSITIONS AND METHODS OF MAKING SAME

(71) Applicants: Rohm and Haas Company, Collegeville, PA (US); Dow Global Technologies LLC, Midland, MI (US)

(72) Inventors: Jiguang Zhang, Shanghai (CN); Miao Yang, Shanghai (CN); Shaoguang Feng, Shanghai (CN); Zhaohui Qu, Shanghai (CN)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 427 days.

This patent is subject to a terminal disclaimer.

(21) Appl. No.: 16/325,065

(22) PCT Filed: Aug. 12, 2016

(86) PCT No.: PCT/CN2016/094825
§ 371 (c)(1),
(2) Date: Feb. 12, 2019

(87) PCT Pub. No.: WO2018/027890
PCT Pub. Date: Feb. 15, 2018

(65) Prior Publication Data
US 2021/0284873 A1  Sep. 16, 2021

(51) Int. Cl.
*C09J 7/38* (2018.01)
*C08F 220/18* (2006.01)
*C08F 220/06* (2006.01)
*C08F 220/14* (2006.01)
*C08L 91/00* (2006.01)
*C08F 2/22* (2006.01)

(52) U.S. Cl.
CPC .............. *C08F 2/22* (2013.01); *C08F 220/06* (2013.01); *C08F 220/14* (2013.01); *C08F 220/1802* (2020.02); *C08F 220/1804* (2020.02); *C08F 220/1808* (2020.02); *C08L 91/00* (2013.01); *C09J 7/385* (2018.01); *C09J 2301/302* (2020.08); *C09J 2433/00* (2013.01); *C09J 2491/00* (2013.01)

(58) Field of Classification Search
None
See application file for complete search history.

(56) References Cited

U.S. PATENT DOCUMENTS

| 2,410,089 | A  | * | 10/1946 | Lundquist | C09J 131/04 |
| | | | | | 428/494 |
| 9,469,797 | B2 | * | 10/2016 | Lander | C08G 63/08 |
| 2006/0100357 | A1 | | 5/2006 | Bunn et al. | |
| 2006/0128831 | A1 | | 6/2006 | Cook et al. | |
| 2006/0235131 | A1 | | 10/2006 | Hughes et al. | |
| 2008/0281005 | A1 | * | 11/2008 | Even | C09J 151/003 |
| | | | | | 521/66 |

FOREIGN PATENT DOCUMENTS

| CN | 1329463 | C | | 8/2007 | |
| CN | 104072665 | A | * | 10/2014 | |
| CN | 104151485 | A | | 11/2014 | |
| CN | 104497224 | A | | 4/2015 | |
| CN | 104513343 | A | | 4/2015 | |
| CN | 104017457 | B | | 6/2016 | |
| CN | 105838267 | A | * | 8/2016 | ............ C09J 11/06 |
| EP | 1403353 | A1 | * | 3/2004 | ............ C08F 257/02 |
| GB | 609750 | A | * | 10/1948 | |
| JP | 2000044870 | A | | 1/2000 | |
| JP | 2000290634 | A | | 1/2000 | |
| JP | 2002194271 | A | | 1/2002 | |
| JP | 59149913 | B2 | | 5/2016 | |
| WO | WO-2007101909 | A1 | * | 9/2007 | ............ C08F 242/00 |

OTHER PUBLICATIONS

Roberge, "Emulsion-based pressure sensitive adhesives from conjugated linoleic acid/styrene/butyl acrylate terpolymers", International Journal of Adhesion & Adhesives, May 9, 2016, 70, 17-2015 (Year: 2016).*
Machine translation of CN 105838267 A, retrieved Jun. 2022 (Year: 2022).*
Machine translation of CN 104072665 A, retrieved Feb. 2022 (Year: 2022).*
PCT/CN2016/094825, International Search Report and Written Opinion with a dated Feb. 24, 2017.
PCT/CN2016/094825, International Preliminary Report on Patentability with a dated Feb. 12, 2019.

* cited by examiner

*Primary Examiner* — Nicole M. Buie-Hatcher
(74) *Attorney, Agent, or Firm* — Boyle Fredrickson, S.C.

(57) ABSTRACT

Water-based pressure sensitive adhesive composition and methods of make the same are provided. The water-based pressure sensitive adhesive composition comprises at least one interpolymer dispersed within an aqueous medium, the interpolymer comprising at least one unsaturated monomer and at least one compound selected from a group consisting of at least one conjugated acid, at least one ester of a conjugated acid, and mixtures thereof.

10 Claims, No Drawings

WATER-BASED PRESSURE SENSITIVE ADHESIVE COMPOSITIONS AND METHODS OF MAKING SAME

FIELD OF THE DISCLOSURE

The instant disclosure relates to pressure sensitive adhesive compositions. More particularly, the disclosure relates to water-based pressure sensitive adhesive compositions with improved water whitening resistance and methods of making the same.

BACKGROUND AND SUMMARY OF THE DISCLOSURE

Adhesive compositions are useful for a wide variety of purposes. One particularly useful subset of adhesive compositions is water-based pressure sensitive adhesives. The use of water-based pressure sensitive adhesives in different end-use applications is generally known. For instance, water-based pressure sensitive adhesives can be used with labels, notepads, tapes, decals, bandages, decorative and protective sheets, and a wide variety of other products.

As used in the art, the term "pressure sensitive adhesive" designates a material comprising one or more polymer compositions which, when dried, is aggressively and permanently tacky at room temperature. Further, the term "water-based" indicates that the pressure sensitive adhesive is manufactured with an aqueous carrier. A typical water-based pressure sensitive adhesive will firmly adhere to a variety of dissimilar surfaces upon mere contact without the need of more than finger or hand-applied pressure.

One property of pressure sensitive adhesives recognized by the pressure sensitive adhesives industry, particularly for those exposed to moisture, is water-whitening resistance. Attempts to improve the water whitening resistance of pressure sensitive adhesives, such as by using polymerizable surfactant in place of traditional surfactant, have not been commercially ideal. This is because polymerizable surfactants are relatively more expensive than traditional surfactants and not as widely available. The water whitening property of water-based pressure sensitive adhesives is particularly important when the adhesive is to be used in an application requiring good optics, e.g., clear film labels.

Therefore, water-based pressure sensitive adhesive compositions with improved water whitening resistance and good adhesion and cohesion, and methods of making same, are desirable.

A composition is disclosed comprising at least one interpolymer dispersed within an aqueous medium, the interpolymer comprising at least one unsaturated monomer and at least one compound selected from the group consisting of at least one conjugated acid, at least one ester of a conjugated acid, and mixtures thereof. The composition can further comprise at least one surfactant.

The conjugated acid may comprise an aliphatic acid. Further, the conjugated acid may comprise an aliphatic carboxylic acid, such as an aliphatic carboxylic acid comprising at least three conjugated carbon-carbon double bonds. Still further, the conjugated acid may be derived from a naturally-occurring dry oil, such as tong oil. Even further, the composition may further include optionally one or more thickeners, optionally one or more defoamers, optionally one or more wetting agents, optionally one or more mechanical stabilizers, optionally one or more pigments, optionally one or more fillers, optionally one or more freeze-thaw agents, optionally one or more neutralizing agents, optionally one or more plasticizers, optionally one or more tackifiers, optionally one or more adhesion promoters, and combinations thereof.

Methods for preparing a composition are also disclosed. The method comprises dispersing at least one unsaturated monomer and, optionally at least one surfactant, in an aqueous medium to form an emulsified mixture. The method further comprises introducing at least one initiator to the emulsified mixture, thereby polymerizing the at least one unsaturated monomer, and introducing at least one compound selected from the group consisting of at least one conjugated acid, at least one ester of a conjugated acid, and mixtures thereof to the emulsified mixture during polymerization of the at least one unsaturated monomer, thereby forming an interpolymer comprising the at least one unsaturated monomer and the compound.

The interpolymer is stabilized in the emulsified mixture by the at least one surfactant. Further, at least one compound selected from the group consisting of at least one conjugated acid, at least one ester of a conjugated acid, and mixtures thereof is introduced to the emulsified mixture when the unsaturated monomer is being introduced to the aqueous medium. In some embodiments, the compound is introduced to the aqueous medium after at least 50% of the unsaturated monomer is introduced to the aqueous medium, or after at least 70% of the unsaturated monomer is introduced to the aqueous medium, or after at least 90% of the unsaturated monomer is introduced to the aqueous medium. The compound can be introduced to the aqueous medium at any time while the monomer emulsion is being fed to the aqueous medium.

A water-based pressure sensitive adhesive comprising the composition prepared according to the method above is also disclosed.

DETAILED DESCRIPTION OF THE DISCLOSURE

The instant disclosure relates to water-based pressure sensitive adhesive compositions with improved water whitening resistance and good adhesion and cohesion, and methods of making same. According to one embodiment of the disclosure, the water-based pressure sensitive adhesive composition comprises an emulsion comprising at least one interpolymer dispersed within an aqueous medium. The interpolymer comprises at least one unsaturated monomer and at least one compound selected from the group consisting of at least one conjugated acid, at least one ester of a conjugated acid, and mixtures thereof. The interpolymer can be formed via emulsion polymerization.

Generally, at least one unsaturated monomer is dispersed throughout an aqueous medium together with a surfactant, thereby forming an emulsified mixture. The surfactant acts as an emulsifier and enables droplets of the at least one unsaturated monomer, which is hydrophobic, to form throughout the aqueous medium. An initiator is then introduced into the emulsified mixture. The initiator is configured to react with the at least one unsaturated monomer, thereby forming a polymer comprising unsaturated monomer subunits. The initiator reacts with the at least one unsaturated monomer dispersed throughout the aqueous medium until all or substantially all of the at least one unsaturated monomer is polymerized. The end result is a dispersion of polymer particles in the aqueous medium, the polymer particles comprising the at least one unsaturated monomer subunits.

According to the present disclosure, at least one compound selected from the group consisting of at least one conjugated acid, at least one ester of at least one conjugated acid, and mixtures thereof is introduced to the emulsified mixture after the initiator is introduced to the emulsified mixture, but before all of the at least one unsaturated monomer is fed to the aqueous medium. The compound can be added to the mixture at any time when the unsaturated monomer is being added to the mixture. In some embodiments, the compound is added after at least 50% of the at least one unsaturated monomer is introduced to the aqueous medium. In some embodiments, the compound is added after at least 70% of the unsaturated monomer is introduced to the aqueous medium. In some embodiments, the compound is added after at least 80% of the unsaturated monomer is introduced to the aqueous medium. In some embodiments, the compound is added after at least 90% of the unsaturated monomer is introduced to the aqueous medium.

Upon addition into the emulsified mixture, the at least one compound selected from the group consisting of at least one conjugated acid, at least one ester of at least one conjugated acid, and mixtures thereof functions as a co-monomer and forms an interpolymer together with the at least one unsaturated monomer. The end result is a dispersion throughout the aqueous medium of both the polymer, comprising only the at least one unsaturated monomer subunits, and the interpolymer, comprising both the at least one unsaturated monomer subunits and submits comprising the at least one compound selected from the group consisting of at least one conjugated acid, at least one ester of the at least one conjugated acid, and mixtures thereof.

As will be discussed in further detail below and illustrated by way of examples, formation of the interpolymer comprising both unsaturated monomer subunits and the at least one compound subunits results in a composition that, when applied in a pressure sensitive adhesive application, provides improved water whitening resistance relative to existing pressure sensitive adhesive formulations.

In some embodiments, at least one unsaturated monomer may be introduced into the aqueous medium and polymerized, forming polymers and/or interpolymers. Examples of the at least one unsaturated monomer include, but are not limited to, acrylates such as butyl acrylate, ethylhexyl acrylate, ethyl acrylate, methyl acrylate, octyl acrylate, isooctyl acrylate, decyl acrylate, isodecyl acrylate, lauryl acrylate and cyclohexyl acrylate methacrylates such as methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates and cyclohexyl methacrylate, styrene, vinyl ester, and combinations thereof. The at least one unsaturated monomer is present in the final emulsified mixture from 30 to 70 weight percent, based on the total weight of the mixture. All subranges from 30 to 70 are included and disclosed herein. For example, the range can be from a lower limit of 30, 35, 40, or 45 weight percent to an upper limit of 63, 65, or 70.

In some embodiments, at least one surfactant may optionally be introduced into the aqueous medium for stabilizing the at least one unsaturated monomer and the at least one interpolymer dispersed throughout the aqueous medium. Examples of the at least one surfactant include, but are not limited to, cationic surfactants, anionic surfactants, zwitterionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol, or alkoxylated polysiloxane. The at least one surfactant is present in the emulsified mixture from 0.05 to 10 weight percent. All subranges from 0.05 to 10 are included herein and disclosed herein. For example, the range can be from a lower limit of 0.05, 0.07, 0.1, or 0.2 to an upper limit of 0.5, 0.7, 1, 2, or 10.

In some embodiments, at least one compound selected from the group consisting of at least one conjugated acid, at least one ester of at least one conjugated acid, and mixtures thereof may be introduced into the aqueous medium and polymerized together with the unsaturated monomer subunits. Examples of the at least one conjugated acid include, but are not limited to, unsaturated fatty acids. Suitable unsaturated fatty acids include fatty acids derivable from naturally-occurring drying oils, such as tung oil. In particular, tung oil comprises glycerol ester of α-eleostearic acid, linoleic acid, palmitic acid, and oleic acid is suitable for the purposes of this disclosure. Examples of the ester of at least one conjugated acid includes naturally derivable oils, such as tung oil.

Tung oil fatty acid generally has the structure according to (I) as main component and tung oil generally has the illustrative structure according to (II):

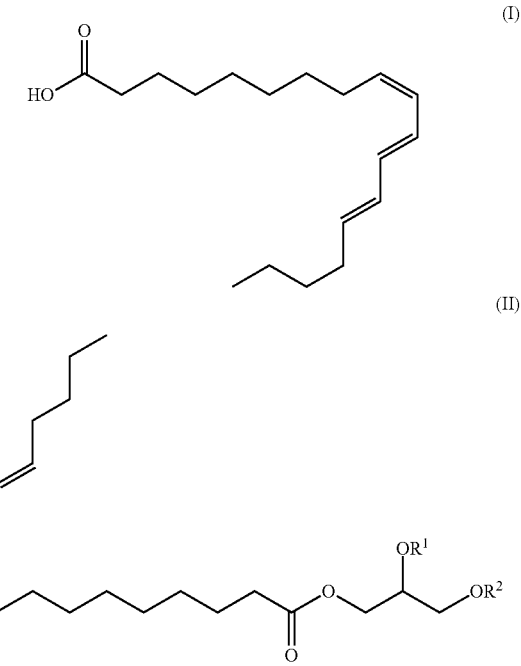

Examples of the at least one conjugated acid further include, but are not limited to, aliphatic acids, in particular aliphatic carboxylic acids comprising three or more conjugated carbon-carbon double bonds. In particular, α-eleostearic acid is suitable for the purpose of this disclosure. The at least one conjugated acid is present in the emulsified mixture from 0.01 to 5 weight percent. All individual ratio values and subranges from 0.01 to 5 are included herein and disclosed herein. For example, the ratio can be from a lower limit of 0.01, 0.05, 0.10, or 0.25 to an upper limit of 1, 2, 3, 4, or 5.

In some embodiments, more than one initiator may be introduced into the emulsified mixture for polymerizing the at least one unsaturated monomer. The at least one initiator can be either a thermal initiator or a redox system initiator. One example of the at least one thermal initiator includes, but is not limited to, ammonium persulfate. Where the initiator is a redox system initiator, the reducing agent can be, for example, an ascorbic acid, a sulfoxylate, or an erythorbic acid, while the oxidating agent can be, for example, a peroxide or a persulfate. The at least one initiator is present in the emulsified mixture from 0.05 to 2 weight percent. All subranges from 0.05 to 2 are included herein and disclosed herein. For example, the range can be from a lower limit of 0.05, 0.07, 0.09, or 0.1 to an upper limit of 0.8, 1, 1.3, 1.8, or 2.

As discussed above, the interpolymer comprises at least one unsaturated monomer subunit and submits comprising the at least one compound selected from the group consisting of at least one conjugated acid, at least one ester of the at least one conjugated acid, and mixtures thereof. The pressure sensitive adhesive composition may further include, optionally, one or more additives. Examples of the one or more additives include, but are not limited to, at least one thickener, at least one defoamer, at least one wetting agent, at least one mechanical stabilizer, at least one pigment, at least one filler, at least one freeze-thaw agent, at least one neutralizing agent, at least one plasticizer, at least one tackifier, at least one adhesion promoter, and/or combinations thereof.

The water-based pressure sensitive adhesive composition may comprise 0 to 5 percent by weight of at least one thickener. All individual values and subranges from 0 to 5 weight percent are included herein and disclosed herein. For example, the weight percent of the at least one thickener can be from a lower limit of 0, 0.1 0.2, 0.3, or 0.5 weight percent to an upper limit of 1, 2, 3, 4, or 5 weight percent. Example thickeners include, but are not limited to, ACRYSOL™, UCAR™ and CELOSIZE™ which are commercially available from The Dow Chemical Company, Midland, Mich.

The water-based pressure sensitive adhesive composition may comprise 0 to 2 percent by weight at least one neutralizing agent. All individual values and subranges from 0 to 2 weight percent are included herein and disclosed herein. For example, the weight percent of the at least one neutralizing agent can be from a lower limit of 0, 0.2, 0.3, or 0.5 weight percent to an upper limit of 0.5, 1, 1.5, or 2 weight percent. Neutralizing agents are typically used to control pH to provide stability to the formulated pressure sensitive adhesive composition. Examples of the at least one neutralizing agent include, but are not limited to, aqueous ammonia, aqueous amines, and other aqueous inorganic salts.

The water-based pressure sensitive adhesive composition may comprise less than 50 percent by weight at least one tackifier. All individual values and subranges from less than 50 weight percent are included herein and disclosed herein. For example, the weight percent of the at least one tackifier can be from a lower limit of 0, 0.1, 0.2, 0.3, 0.5, 1, 2, 3, 4, or 5 weight percent to an upper limit of 10, 20, 30, 40, or 50 weight percent. Examples of the at least one tackifier include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, and combinations thereof.

The water-based pressure sensitive adhesive composition may comprise less than 5 percent by weight of at least one adhesion promoters. All individual values and subranges from less than 5 weight percent are included herein and disclosed herein. For example, the weight percent of the at least one adhesion promoter can be from a lower limit of 0, 0.1, 0.2, 0.3, 0.5, 1, 2, 3, or 4 weight percent to an upper limit of 0.1, 0.2, 0.3, 0.5, 1, 2, 3, 4, 5 weight percent.

Examples of the Disclosure

The present disclosure will now be explained in further detail by discussing Illustrative Examples and Comparative Examples. However, the scope of the present disclosure is not, of course, limited to these Illustrative Examples.

Emulsion Polymerization Procedure

In general, the emulsion mixture according to the disclosure is prepared as follows. A four liter, five-neck reactor equipped with a condenser, a mechanical stirrer, a temperature-controlled thermal couple and inlets for initiators and monomers, is fed with 675 g of deionized ("DI") water and heated to 88° C. under a gentle $N_2$ flow. In a separate container, a monomer emulsion ("ME") is prepared by mixing 275 g of DI water, 10 g of a sodium dodecylbenzene sulfonates surfactant, such as RHODACAL™ DS-4 from Solvay S.A., Brussels, Belgium ("DS-4"), 11.9 g of a fatty alcohol ethersulfates surfactant, such as DISPONIL™ FES77 surfactant ("FES-77) from BASF SE, Ludwigshafen, Germany, 2.5 g of $Na_2CO_3$, and 1,672 g of a monomer mixture comprising 2-ethylhexyl acrylate ("2-EHA"), butyl acrylate ("BA"), ethyl acrylate ("EA"), methyl methacrylate ("MMA"), and acrylic acid ("AA").

Next, a solution of a mixture of $Na_2CO_3$ and ammonium persfulate ("APS") in 40 g DI water is added into the reactor Immediately after addition of the solution of $Na_2CO_3$ and APS, the monomer emulsion is fed into the reactor. The feeding proceeds for 80 minutes. To achieve the disclosed compositions, a tung acid mixture comprising tung acid, mono-functional ester of tung acid and glycerol, di-functional ester of tung acid and glycerol, ("T-160") or tung oil (both commercial available from Anhui Refined Oil and Fatty Co., Ltd, China) is added into the monomer Upon completion of the monomer emulsion addition, the reaction mixture is cooled to 60° C. before gradual addition of a solution of tert-butyl hydroperoxide (70%) ("t-BHP") (9.2 g in 32 g DI water) and 6.8 g of a reducing agent, such as BRUGGOLITE™ FF6 M from Brüggemann Chemical US Company, Chadds Ford, Pa. ("FF6"), in 34.5 g DI water, via two separate pipes over 30 minutes. Upon completion of the feeds, the reaction is cooled to room temperature. The obtained composition is then filtered through 325 mesh filter cloth to prepare the composition for subsequent evaluation work.

Pressure Sensitive Adhesive Formulation

All samples are lightly formulated with a wetting agent, such as 0.5% (wet/wet) AEROSOL™ GPG wetting agent obtained from Cytec, Woodland Park, N.J. ("GPG"), based on total emulsion, to improve wet-out for lab drawdowns unless otherwise specified. The viscosity is then adjusted to about 600 cps (Brookfield, RVDV, 30 rpm, 63 #) using a thickener, such as ACRYSOL™ RM-2020 from The Dow Chemical Company, Midland, Mich. ("RM-2020"), and final pH is adjusted to 7.0 to 7.5 using ammonia.

Lab Drawdowns

Polyethylene ("PE") film, is pre-treated by corona treatment before lamination. The formulated adhesive is coated to a release liner in an amount of 18 g/m² on a dry-weight basis and dried at 80° C. for 6 minutes. The PE film is laminated with the pressure sensitive adhesive coated release liner in such a manner that the adhesive layer is in contact with the corona treated side of PE film to give an adhesive laminate.

Water Whitening Resistance Test

Performance testing is conducted after the adhesive laminate is conditioned in a controlled environment (22-24° C., 50-60% relative humidity) testing laboratory for at least overnight.

After removing the liner from the prepared laminates, the adhesive coated PE film is immersed in water at room temperature for 3 hours. Then, the transparency and haze properties of the adhesive coated PE film are evaluated on a BYK Haze Gard Plus measurement apparatus. Transparency and haze are measured in accordance to ASTM method D1003. Higher transparency is indicative of better water whitening resistance while lower haze is indicative of better water whitening resistance.

The methodology allows for comparison between samples made with and without in-process-added tung oil or tung acid. In each case, it was found that the addition of tung acid or tung oil significantly improve water whitening resistance performance.

Adhesive Composition Formulations

The Illustrative Examples ("IE") and Comparative Examples ("CE") (collectively, "the Examples") are prepared according to the formulations set forth in Table 1, the units indicating parts by weight.

TABLE 1

Compositions For IE And CE

| Example | 2-EHA | EA | MMA | AA | Tung Oil | Tung Acid | Total |
|---------|-------|------|-----|----|---------|----------|-------|
| CE1 | 71.5 | 18.5 | 9 | 1 |  |  | 100.0 |
| CE2 | 71.5 | 18.5 | 9 | 1 | 0.5[a] |  | 100.5 |
| IE1 | 71.5 | 18.5 | 9 | 1 | 1[b] |  | 101.0 |
| IE2 | 71.5 | 18.5 | 9 | 1 | 0.5[c] |  | 100.5 |
| IE3 | 71.5 | 18.5 | 9 | 1 | 0.5[b] | 0.5[b] | 101.0 |
| IE4 | 71.5 | 18.5 | 9 | 1 | 0.5[d] | 1[c] | 101.5 |
| IE5 | 71.5 | 18.5 | 9 | 1 | 0.5[d] | 0.5[c] | 101.0 |
| IE6 | 71.5 | 18.5 | 9 | 1 |  | 1[d] | 101.0 |
| IE7 | 71.5 | 18.5 | 9 | 1 | 1[d] |  | 101.0 |

[a] added post-blend
[b] added at 95% monomer emulsion feeding
[c] added at 90% monomer emulsion feeding
[d] added throughout monomer emulsion feeding Performance Results Performance results for the Examples, which are tested on a BYK Haze Gard Plus measurement apparatus as discussed above, are summarized in Table 2. The haze and transparency values detailed in Table 2 represent percent haze and percent transparency.

TABLE 2

Performance Results For IE And CE

| Sample | Haze (%) | Transparency (%) |
|--------|----------|------------------|
| CE1 | 55 | 86 |
| CE2 | 55 | 85 |
| IE1 | 40 | 89 |
| IE2 | 46 | 86 |
| IE3 | 38 | 89 |
| IE4 | 34 | 90 |
| IE5 | 47 | 87 |
| IE6 | 34 | 88 |
| IE7 | 48 | 83 |

As indicated in Table 2, it is surprisingly found that the use of a conjugated acid or ester of a conjugated acid, such as tung oil and/or tung acid during polymerization in the IE, improves water whitening resistance of the adhesive compositions. In particular, CE1, which contains no tung oil or tung acid, exhibits the highest haze of the Examples and low transparency of the Examples. CE2, which contains tung oil added after the remaining components are blended, exhibits the highest haze and the second lowest transparency of the Examples. IE1-IE7 each exhibit significantly lower haze than either CE1 or CE2. In addition, IE1 and 1E3-1E6 each exhibit higher transparency than either CE1 or CE2. While 1E2 and 1E7 are only similar to the transparency of CE1, it exhibits significantly lower haze than CE1.

According, comparison of the Examples demonstrates that compositions for use in pressure sensitive adhesive applications prepared according to the present disclosure exhibit increased water whitening resistance compared to existing compositions. Based on the comparisons above, it can be seen that this advantageous feature is attributable to the inclusion of at least one compound selected from the group consisting of a conjugated acid, an ester of a conjugated acid, or mixtures thereof during emulsion polymerization, particularly when derived from tong oil.

The invention claimed is:

1. A water-based pressure sensitive adhesive composition, comprising:
   an emulsion comprising
   (A) at least one interpolymer dispersed within an aqueous medium, the interpolymer consisting of (i) at least one acrylate and (ii) optionally acrylic acid, and
   (B) at least one compound selected from the group consisting of at least one conjugated acid derived from tung oil, tung oil, and mixtures thereof.

2. The water-based adhesive composition of claim 1, wherein the at least one compound comprises from 0.01 to 5 percent by weight of the interpolymer.

3. A water-based pressure sensitive adhesive comprising the adhesive composition prepared according to claim 1.

4. The water-based adhesive composition of claim 1, wherein
   the at least one acrylate is selected from the group consisting of butyl acrylate, 2-ethylhexyl acrylate, ethyl acrylate, methyl acrylate, octyl acrylate, isooctyl acrylate, decyl acrylate, isodecyl acrylate, lauryl acrylate, cyclohexyl acrylate, methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates, cyclohexyl methacrylate, and combinations thereof.

5. The water-based adhesive composition of claim 4, wherein the acrylic acid is present in the interpolymer.

6. The water-based adhesive composition of claim 1 wherein the at least one acrylate is selected from the group consisting of 2-ethylhexyl acrylate, butyl acrylate, ethyl acrylate, methyl methacrylate, and combinations thereof.

7. The water-based adhesive composition of claim 6 wherein the acrylic acid is present in the interpolymer.

8. The water-based adhesive composition of claim 1, wherein the emulsion consists of
   (A) the at least one interpolymer;
   (B) the at least one compound;
   (C) a surfactant; and
   (D) an initiator.

9. The water-based adhesive composition of claim 8 wherein the acrylic acid is present in the at least one interpolymer.

10. The water-based adhesive composition of claim 9 wherein the at least one acrylate is selected from the group consisting of 2-ethylhexyl acrylate, butyl acrylate, ethyl acrylate, methyl methacrylate, and combinations thereof.

* * * * *